Aug. 25, 1936.        J. G. BLACK              2,052,442
                  TEST SCORING MACHINE
              Filed July 3, 1934       5 Sheets-Sheet 1
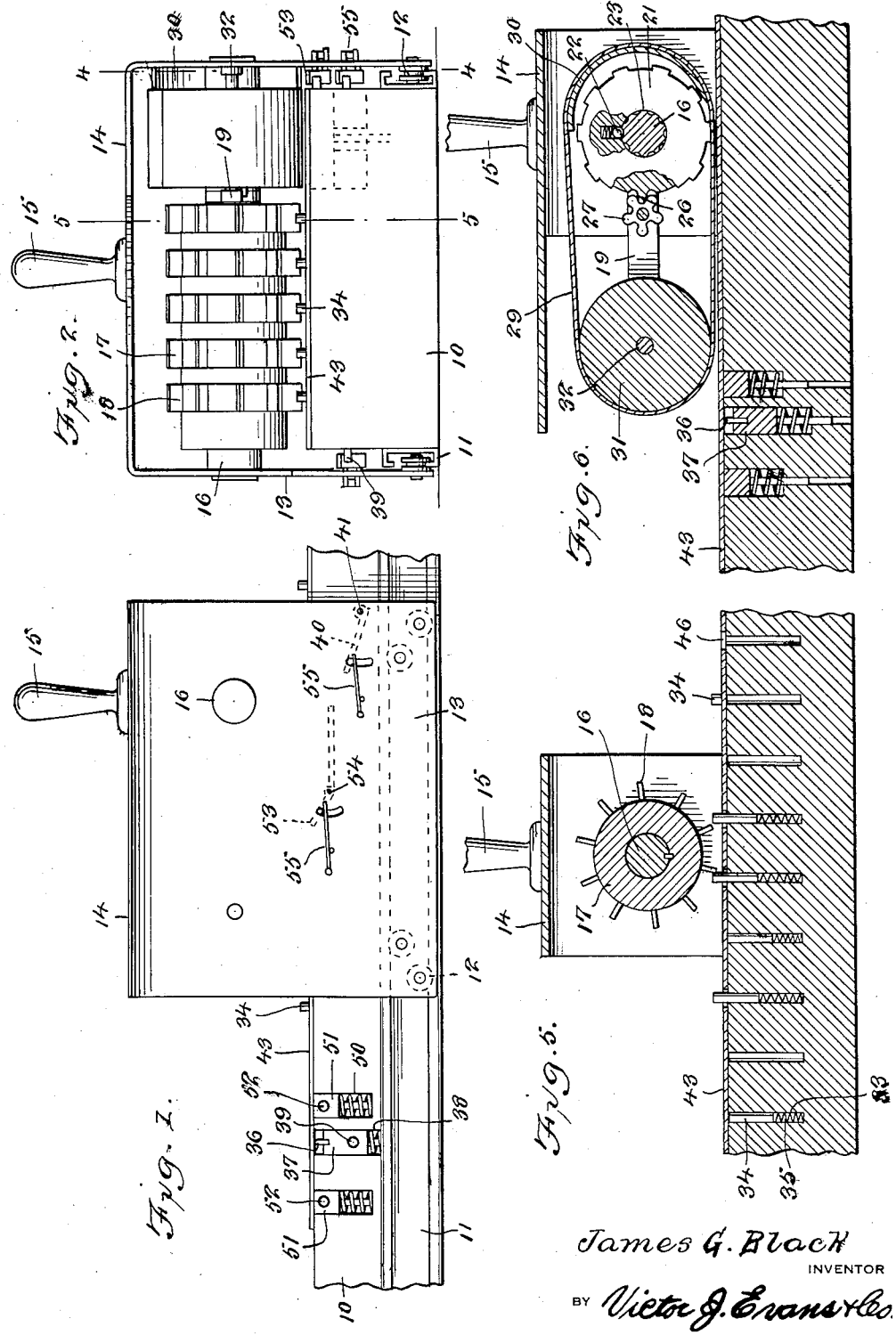
James G. Black
INVENTOR
BY Victor J. Evans & Co.
ATTORNEY Aug. 25, 1936.                J. G. BLACK                2,052,442
                         TEST SCORING MACHINE
                         Filed July 3, 1934          5 Sheets-Sheet 2
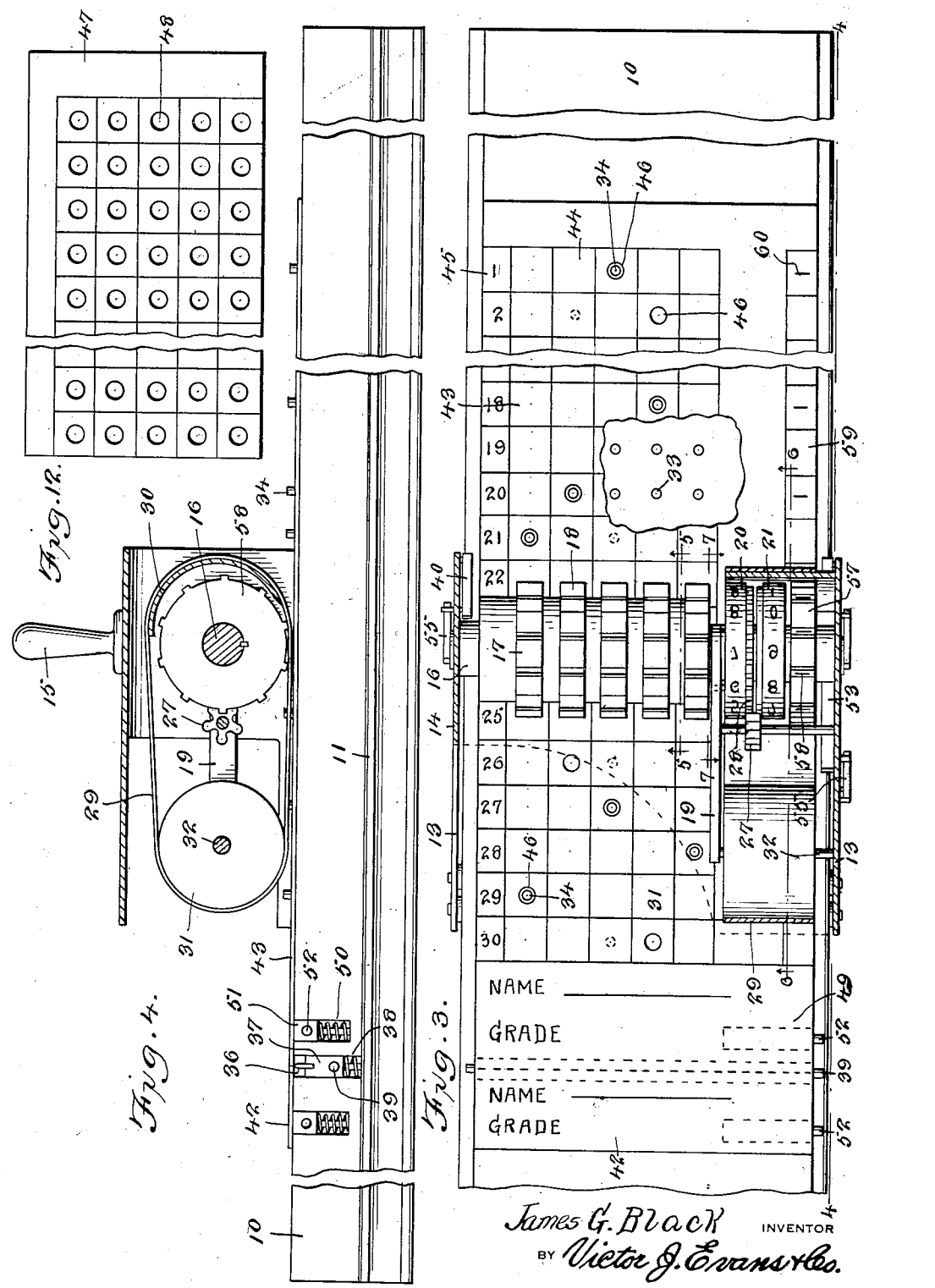
James G. Black  INVENTOR
BY Victor J. Evans & Co.
ATTORNEY

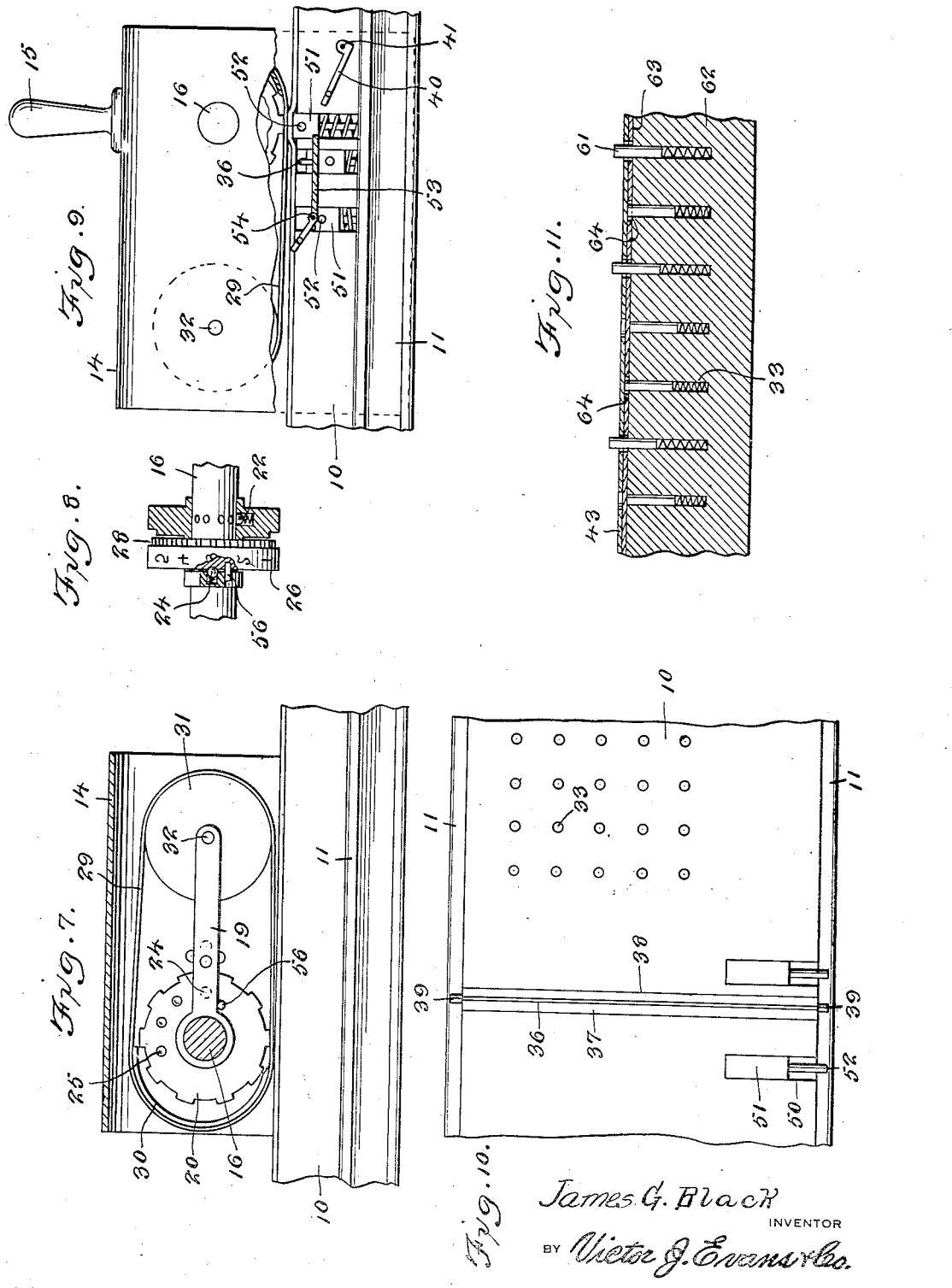

Aug. 25, 1936. J. G. BLACK 2,052,442
TEST SCORING MACHINE
Filed July 3, 1934 5 Sheets-Sheet 4
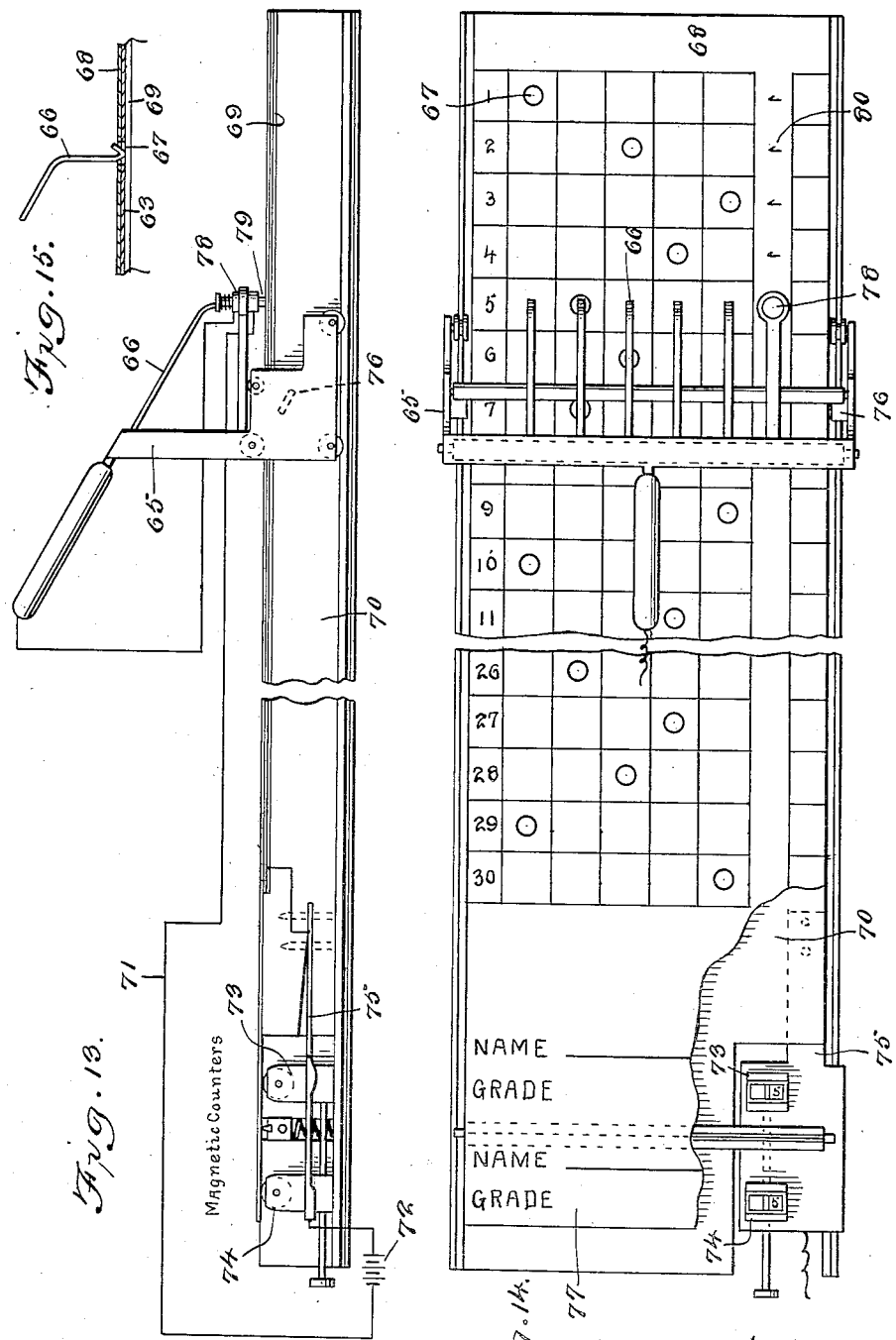

Aug. 25, 1936.  J. G. BLACK  2,052,442
TEST SCORING MACHINE
Filed July 3, 1934  5 Sheets-Sheet 5
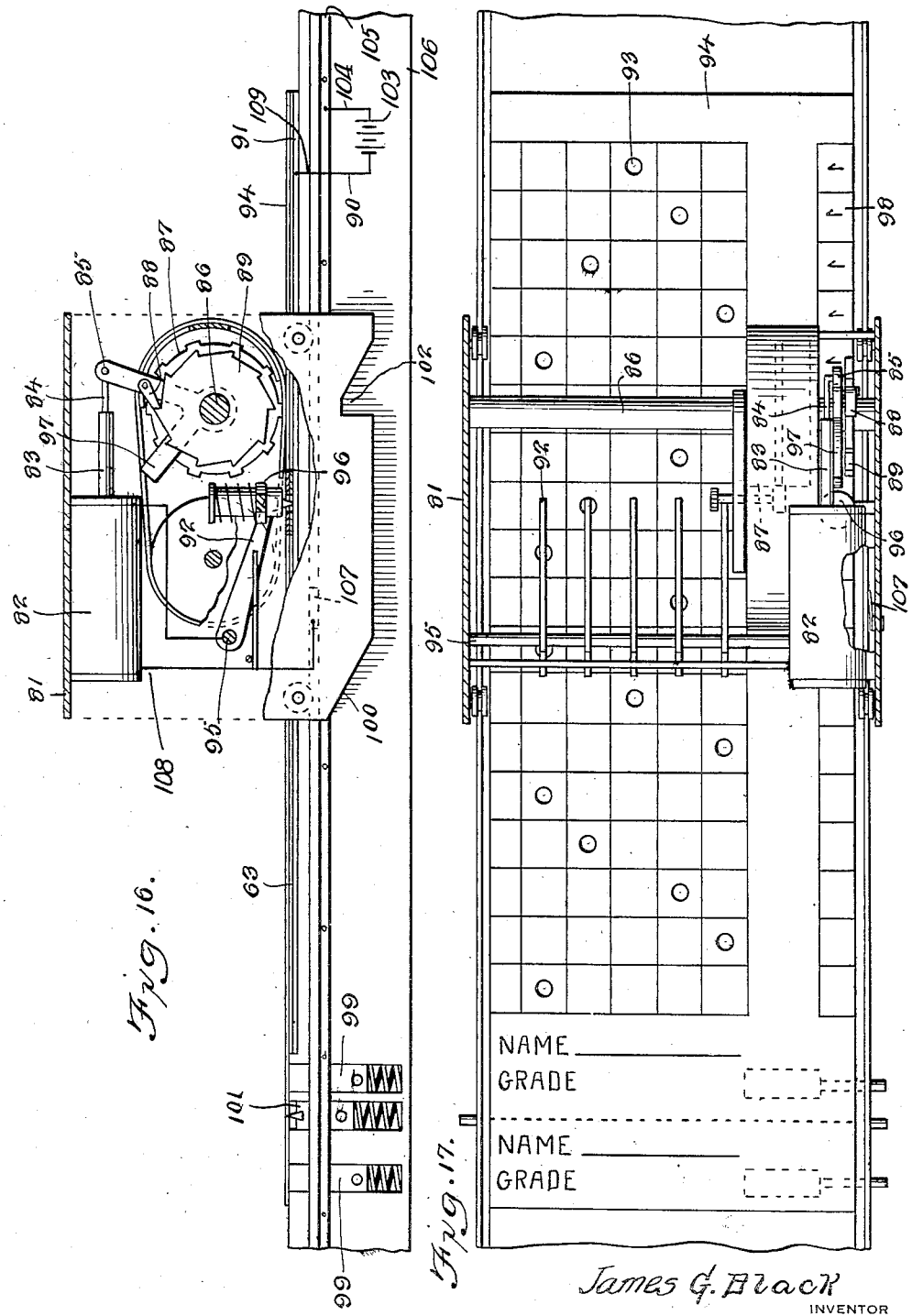
James G. Black
INVENTOR
BY Victor J. Evans & Co.
ATTORNEY Patented Aug. 25, 1936

2,052,442

UNITED STATES PATENT OFFICE 2,052,442

TEST SCORING MACHINE

James G. Black, Morehead, Ky.

Application July 3, 1934, Serial No. 733,656

6 Claims. (Cl. 35—48)

The invention relates to a test scoring or grading machine and more especially to a mechanical counting and recording machine for educational institutions.

The primary object of the invention is the provision of a machine of this character, wherein the scoring or grading of answers to examination questions given by students can be automatically had and the correctness of the answers ascertained with accuracy, thus relieving the educational authorities of the burdensome task of examining test papers as executed by students in solving examination problems in teachings by educational institutions.

Another object of the invention is the provision of a machine of this character, wherein time and labor will be saved for the test scoring of educational examinations as issued to student bodies and a diagnostic record obtained of the test of each student and a checking of multiple answer questions, the working of the machine being automatic and thus relieving instructors of educational institutions of the drudgery and mental strain resultant from the physical examining of the test records, and at the same time each record permits the pupil to see exactly where he or she has made a mistake.

A further object of the invention is the provision of a machine of this character which is comparatively simple in construction, thoroughly reliable and efficient in its operation, mechanically correcting objective examination papers, being sturdy, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary side elevation of a machine constructed in accordance with the invention.

Figure 2 is an end elevation thereof.

Figure 3 is a top plan view, the same being partly in section.

Figure 4 is a fragmentary vertical longitudinal sectional view on the line 4—4 of Figure 3.

Figure 5 is a sectional view on the line 5—5 of Figure 3 looking in the direction of the arrows.

Figure 6 is a sectional view on the line 6—6 of Figure 3 looking in the direction of the arrows.

Figure 7 is a sectional view on the line 7—7 of Figure 3 looking in the direction of the arrows.

Figure 8 is a fragmentary elevation partly in section through the counting and recording mechanism of the machine.

Figure 9 is a side elevation partly broken away showing in detail the control of the cutter and also the stamping beds of the recording mechanism.

Figure 10 is a fragmentary top plan view showing the cutter and said stamping beds.

Figure 11 is a fragmentary vertical longitudinal sectional view showing a slight modification of the machine.

Figure 12 is a fragmentary plan view of a punch templet as employed with the test or examination records.

Figure 13 is a side elevation of a modified form of machine.

Figure 14 is a top plan view thereof.

Figure 15 is a fragmentary vertical longitudinal sectional view thereof.

Figure 16 is a side elevation partly in section of a further modification of machine.

Figure 17 is a top plan view, partly in section, of the same.

Similar reference characters indicate corresponding parts throughout the several views in the drawings.

Referring to the drawings in detail, particularly Figures 1 to 10 inclusive, there is illustrated the preferred embodiment of the invention which comprises a bed 10, which is of the required width and length, having at opposite longer edges thereof rails 11 constituting tracks upon which travel peripherally grooved wheels or rollers 12, these being journaled to the side cheeks 13 of a carriage 14 straddling the bed 10. This carriage is movable throughout the length of the bed 10 and is manually shiftable by means of a handle 15 rising from the top of said carriage. Suitably journaled in the carriage 14 to be disposed transversely of the said bed 10 is an axle 16 upon which is fixed a series of striker wheels 17, these being separated from each other and located side by side for a distance of the said axle 16. Each wheel 17 of the series has peripherally thereof striker teeth 18 which are spaced an equidistance from each other, preferably there being ten teeth 18 to each wheel, for a purpose presently described.

At one end of the carriage 14, inwardly of its side cheek 13 at that end, is a chassis 19 for mounting the counting and recording mechanisms. The counting and recording mechanism comprises a pair of rotatable counting and printing wheels 20 and 21, respectively, these being loosely journaled upon the axle 16, and at their peripheries have formed raised digits numerically arranged from zero to nine in spaced order with respect to each other. The counting and printing wheels 20 and 21 are disposed side by side upon the axle 16 and the wheel 21 has frictional ratchet action with said axle through the medium of the spring pressed ball 22 engaging a ratchet formation 23 on the axle 16, the spring pressed ball being fixed in the said wheel 21. The wheel 20 has frictional ratchet action with the chassis 19 through the medium of a spring pressed ball 24 fitted in said chassis and engaging seats 25 in the side of said wheel 20, these seats being spaced an equidistance apart and arranged in a circular path. The wheel 21 is formed with the single carrying tooth 26 located intermediate the digits zero and nine thereon and engaging a toothed carrying pinion 27 which meshes with a toothed carrying gear 28 at the side of the wheel 20. Thus it will be seen that the axle 16 will rotate the wheel 21 a complete revolution before the tooth will operate the gear 27 and said wheel 21 successively revolves step by step, each step being one-tenth of the complete revolution of said counter and on each complete revolution of said wheel 21 the wheel 20 will be turned a single step of its revolution.

The inking device comprises an endless inking ribbon 29 trained about an arcuate-shaped guard 30 at one end of the chassis and next to the counting and printing wheels 20 and 21 and a guide roller 31 at the other end of the chassis 19, the journal 32 of the roller 31 having its bearing in the chassis and the side cheek 13 next thereto of the carriage, the lower stretch of the ribbon 29 being adapted to contact and ink the digits peripherally of said wheels 20 and 21, respectively. These said wheels 20 and 21, on the turning thereof, shift the ribbon 29 by frictional engagement therewith for proper ink distribution of the inking device in the operation of the machine.

Formed in the bed 10 are longitudinally and transversely disposed rows of perpendicular sockets 33 for accommodating test pins 34, these being acted upon by springs 35 to protrude the same above the top surface of the bed 10 when unobstructed, in a manner and for a purpose presently described. These pins when projected above the top surface of the bed 10 are engaged by the striker teeth 18 of the striker wheel 17 and thus in succession turn the axle 16 for actuating the wheels 20 and 21 on the shifting of the carriage 14 in one direction over the bed 10 of the machine for test scoring purposes.

Near one end of the bed 10 is arranged a cutting blade 36, it being of a length corresponding to the width of the bed 10 and fitted in a spring pressed carrier 37 operating within a guide channel 38 in the bed 10. This carrier 37, at opposite ends, has formed therewith the laterally projecting pins 39, these being engageable with tripping members 40 pivoted, at 41, to the inner faces of the side cheeks 13 of the carriage 14, so as to engage with the said pins 39 for depressing the carrier 37 against the tension of the springs 38, so that when the members 40 override the pins 39 the cutting blades 36 will, under the action of the springs 38, have a plunging action for the severing of a coupon end 42 from a multiple score answer card 43 which has printed or otherwise marked thereon scoring spaces 44, these being disposed in longitudinal and transverse columns, the transverse columns being identified numerically from one to thirty in number, the identifying numerals being indicated at 45. The scoring spaces 44 under a test examination of a student body are to be punched singly with a hole 46 selectively indicative of an answer to a question identified by the numerals 45 upon said card 43. To enable the punching of the holes 46 by the possessor of the card 43 for indicating an answer to a question under a test examination, there is provided a punch templet 47 in the form of a plate of stiff material and having a face marking identical to the space indications 44 on the card 43 and also the punch holes 48, so that by placing the card upon this templet 47, the spaces 44 can be selectively punched, each with a hole 46 indicative of an answer to a question.

The card 43, including its coupon 42, in its creation has formed thereon the spaces 49 and the words "Name" and "Grade", so that there can be indicated in these spaces the name of the student using the card and the grade marking of such student under the test examination result.

At opposite sides of the blade carrier 37 and fitted in suitable pockets or channels 50 in the bed 10 are spring pressed printing platens 51, these having laterally projected pins 52 to be engaged by a tripping member 53 pivoted, at 54, to a side cheek 13 next thereto of the carriage 14. This member 53 is adapted to ride onto the pins 52 in successive order on movement of the carriage 14 and when overriding such pins under the action of the springs the platens 51 will exert a hammer action against the card 43 at the spaces 49 above the said card and coupon 42 for contact with the digits on the counting and printing wheels 20 and 21 for an impression of these digits upon the card and coupon, which impressions are indicative of the final or total scoring under a test examination.

The members 40 and 53 are acted upon by leaf springs 55 carried by the carriage 14, so that such members will be permitted to be inactive upon the carrier 37 and the platens 51 when the carriage is returned to original position or at the fore end of the bed 10 of the machine.

The wheel 20 has fitted therein a stop pin 56 which is adapted to engage with the chassis 19 when the carriage 14 is returned to original position and thus assure the wheel 20 being reset to zero, while the wheel 21 will likewise come to a resetting to zero by the tooth 26 working to meshing engagement with the pinion 27 and this affords accuracy in the working of the machine for the proper counting or scoring in the operation thereof.

In the use of the machine, after a card 43 has been serviced by a student in punching selectively the spaces 44 indicative of answers to questions of a test examination, the said card 43 as punched is placed upon the bed 10 of the machine to be positioned thereon as is disclosed in Figures 1 to 5 of the drawings, and on superimposing the said card upon the bed the holes 46 correctly punched in the card will liberate the test pins 34 to have them project through the holes in register therewith, while those pins 34 not in register with the holes 46 will be held down by the card or in non-projecting position, so that the wheels 17 will not engage therewith, but will engage with the pins 34 projected through the holes 46 in the card and on shifting the carriage 14 over the bed 10 in one direction the teeth 18 of the wheels 17 will engage the projected pins 34, causing the operation of the counting and printing wheels for the registration of the score on the card 43. It is to be understood that the pins 34 are interchangeable in the bed 10 and are located therein in position indicative of the correct answers to questions of a test examination and such pins in their arrangement can only be liberated or projected for scoring purposes should the punched holes 46 in the card 43 be located indicative of the correct answers on placing the card 43 upon the bed 10 of the machine.

On the axle 16 is a marking wheel 57 which is fixed to said axle and at its periphery has the raised marking areas 58, these being adapted for cooperation with the ribbon 30 to impress in a columnar space 59 upon the card 43 markings symbolizing corrections of an answer or answers indicated by the punched holes 46 in the spaces 44 on the card 43, so that by inspection at a glance of the card 43 one can know the number of correct answers scored under a test examination without mental calculation, by counting the punched holes 46 and observing the space location thereof. The marking wheel 57 by its areas 58 impresses a marking, as at 60, upon said card 43 and these markings only take place when the shaft 16 is rotated by a pin 34 projecting through a correctly located hole in the score card.

When final scoring has been had automatically by the machine, the score attained will be indicated by the number of markings in the spaces 49 on said card 43 and its coupon 42, the coupon being severed from the card and serving as a notification presentable to the student taking the test examination, so that he will have knowledge of the grade attained under the test, while the card likewise will have a grade record identical thereto.

In Figure 11 of the drawings there is shown a modification in the arrangement of the test pins, in that the pins 61 are not arranged for interchanging but are permanently present in the bed 62 of the machine, but in lieu of arranging the pins 34 in conformity with correctness of answers, there is superimposed upon the bed 62 a pre-prepared pattern 63 having the holes 64 therein located according to correct answers of a test examination for liberating only those pins 61 in register with said holes 64, the others being retarded or held back by such pattern 63 overlying the sockets for said pins.

In Figures 13, 14 and 15 of the drawings there is shown a modification, wherein the carriage 65 carries a plurality of spring contacts 66, these being engageable through the punched holes 67 in a card 68 with a stationary contact 69 in the form of a plate upon the bed 70 of the machine, the spring contacts 66 and the stationary contact 69 being arranged in an electric circuit 71 including a battery 72, the circuit being usually open but is closed when any one or all of the spring contacts 66 engage the stationary contact 69. In the circuit 71 are the electrically operated counting and printing mechanisms 73 and 74, respectively, they being supported upon a spring hanger 75 suitably carried by the bed 70 and operated by a tripping member 76 upon the carriage 65 for hammer action against the card 68 for stamping the scoring in duplicate both upon said card 68 and the coupon 77, a part thereof. The counting and printing mechanisms 73 and 74 may be of any suitable form, for instance, that shown in U. S. Patent 741,881 dated October 20, 1903.

Included in the circuit 71 is a solenoid 78, its armature 79 being constructed to constitute a marker for marking, as at 80, upon the card 68 correctness of answers as identified by the scoring operation of the machine. The unpunched portion of the card will prevent the contacts 66 engaging the stationary contact 69 and thus the circuit 71 will be opened, so that the counting mechanisms 73 and 74 will be passive or inactive, they becoming active for successive registering operation upon the closing of the circuit 71, the latter being intermittently opened and closed as heretofore explained.

In Figures 16 and 17 of the drawings there is shown a further modification of the invention, wherein the carriage 81 carries a solenoid 82, its armature 83 being connected through a link 84 with a rocking arm 85 adapted for turning movement upon the axle 86 for the counting and printing mechanism 87. This arm 85 carries a ratchet dog 88 operable upon a ratchet gear 89 included with said mechanism 87 for the working thereof in a step by step manner. The solenoid 82 is included in an electric circuit 90 having the conductor 91, the circuit 90 being normally open and being closed by any one of a series of spring pressed contacts 92 arranged in the said circuit and within the carriage 81. Each contact 92 when liberated through a hole 93 punched in the card 94 engages the conductor 91 for the closing of the circuit and under the closing of said circuit the solenoid 82 is energized for operating the arm 85 which actuates the counting and printing mechanism 87, as should be apparent. The contacts 92 are common to a pivot 95 therefor and journaled within the carriage 81. Specifically describing the circuit 90 a battery 103 has one side connected by a wire 104 to a bus bar 105 on the bed 106 engaged by a brush 107 fixed to the carriage 81 and connected by a wire 108 to one side of the solenoid 82. The other side of the battery is connected by a wire 109 to the conductor 91 and the other side of the solenoid 82 is connected to the pivot 95 by a wire 110. When a contact 92 engages the conductor 91 the current travels from one side of the battery 103 through the wire 109, conductor 91, contact 92, pivot 95 and wire 100 to one side of the solenoid 82 and back to the other side of the battery by way of wire 108, brush 107, bus bar 105 and wire 104.

Supported within the carriage 81 is a spring tensioned marker 96, the same being actuated by an extension 97 on the arm 85 to mark indications 98 upon the card 94 of correctness of answers in a test examination. The printing or stamping platens 99 are operated by a cam edge 100 and a notch 102 therein on the carriage 81 which ride over the pins 52 to depress and tension said platens and to release the same successively when the counting and printing wheels 20 and 21 are vertically aligned with said platens. Likewise the cutting blade carrier 101 is operated by said cam edge 100 and notch 102 in the same manner, this cutting blade 101 serving to sever the coupon end from the card as hereinbefore mentioned.

The spring contacts 66 functioning with the stationary contact 69 serve as circuit closing devices or switches on the engagement of these contacts with each other. It is, of course, understood that underlying the cards 68 and 94 is the pattern 63 having the holes 64 located properly therein for the scoring of correct answers to a test examination, as before indicated.

It is clearly obvious that the machine in its operation will score the correct answers and total the same for the grading of a student taking a test examination and a record thereof is had without mental calculation or physical exertion by the user of the machine and accuracy in scoring is assured.

What is claimed is:

1. In a machine of the character described, a bed having test pins movable above a working face of said bed, said bed adapted to have superimposed thereon a scoring card that has scoring openings therein for liberating certain of the test pins for projection above said card, a carriage movable over the bed, counting mechanism on said carriage, means on the carriage and controlled by the projected test pins for actuating the counting mechanism, and mechanism cooperating with the counting mechanism for recording the result made by said counting mechanism upon the card in duplicate.

2. In a machine of the character described, a bed having test pins movable above a working face of said bed, said bed designed to have superimposed thereon a scoring card having scoring openings therein for liberating certain of the test pins for projection above said card, a carriage movable over the bed, counting mechanism on said carriage, means on the carriage and controlled by the projected test pins for actuating the counting mechanism, mechanism cooperating with the counting mechanism for recording a scoring computed thereby upon the card in duplicate, and marking mechanism cooperating with the counting mechanism to indicate upon the card the correctness of the result made by the said counting mechanism.

3. In a machine of the character described, a bed having test pins movable above a working face of said bed, said bed designed to have superimposed thereon a scoring card having scoring openings therein for liberating certain of the test pins for projection above said card, a carriage movable over the bed, counting mechanism on said carriage, means on the carriage and controlled by the projecting test pins for actuating the counting mechanism, mechanism cooperating with the counting mechanism for recording a scoring computed thereby upon the card in duplicate, marking mechanism cooperating with the counting mechanism to indicate upon the card the correctness of the result made by the counting mechanism, tracks at opposite sides of the bed, and rollers on the carriage to traverse the tracks.

4. In a machine of the character described, a bed having test pins movable above a working face of said bed, said bed designed to have superimposed thereon a scoring card having scoring openings therein for liberating certain of the test pins for projection above said card, a carriage movable over the bed, counting mechanism on said carriage, means on the carriage and controlled by the projected test pins for actuating the counting mechanism, mechanism cooperating with the counting mechanism for recording a scoring computed thereby upon the card in duplicate, marking mechanism cooperating with the counting mechanism to indicate upon the card the correctness of the result made by said counting mechanism, tracks at opposite sides of the bed, rollers on the carriage to traverse the tracks, and means for inking the counting and marking mechanisms.

5. In a machine of the character described, a bed having test pins movable above a working face of said bed, said bed designed to have superimposed thereon a scoring card having scoring openings therein for liberating certain of the test pins for projection above said card, a carriage movable over the bed, counting mechanism on said carriage, means on the carriage and controlled by the projected test pins for actuating the counting mechanism, mechanism cooperating with the counting mechanism for recording the result made by said counting mechanism upon the card in duplicate, means controlled by the carriage for severing the card to separate the duplicate recordings, marking mechanism cooperating with the counting mechanism to indicate upon the card the correctness of the scoring as computed by the counting mechanism, tracks at opposite sides of the bed, rollers on the carriage to traverse the tracks, means for inking the counting and marking mechanisms, and a pattern having correct answer indications and adapted to be disposed beneath the card upon the bed to liberate the test pins confronting the correct answer indications of said pattern.

6. In a machine of the character described, said bed designed to have superimposed thereon a bed having test pins movable above a working face of said bed, a scoring card having scoring openings therein for liberating certain of the test pins for projection above said card, a carriage movable over the bed, counting mechanism on said carriage, means on the carriage and controlled by the projected test pins for actuating the counting mechanism, mechanism cooperating with the counting mechanism for recording the result made by said counting mechanism upon the card in duplicate, means controlled by the carriage for severing the card to separate the duplicate recordings, marking mechanism cooperating with the counting mechanism to indicate upon the card the correctness of the scoring as computed by the counting mechanism, tracks at opposite sides of the bed, rollers on the carriage to traverse the tracks, means for inking the counting and marking mechanisms, a pattern having correct answer indications and adapted to be disposed beneath the card upon the bed to liberate the test pins confronting the correct answer indications of said pattern, and mechanism for resetting counting mechanism.

JAMES G. BLACK.